UNITED STATES PATENT OFFICE.

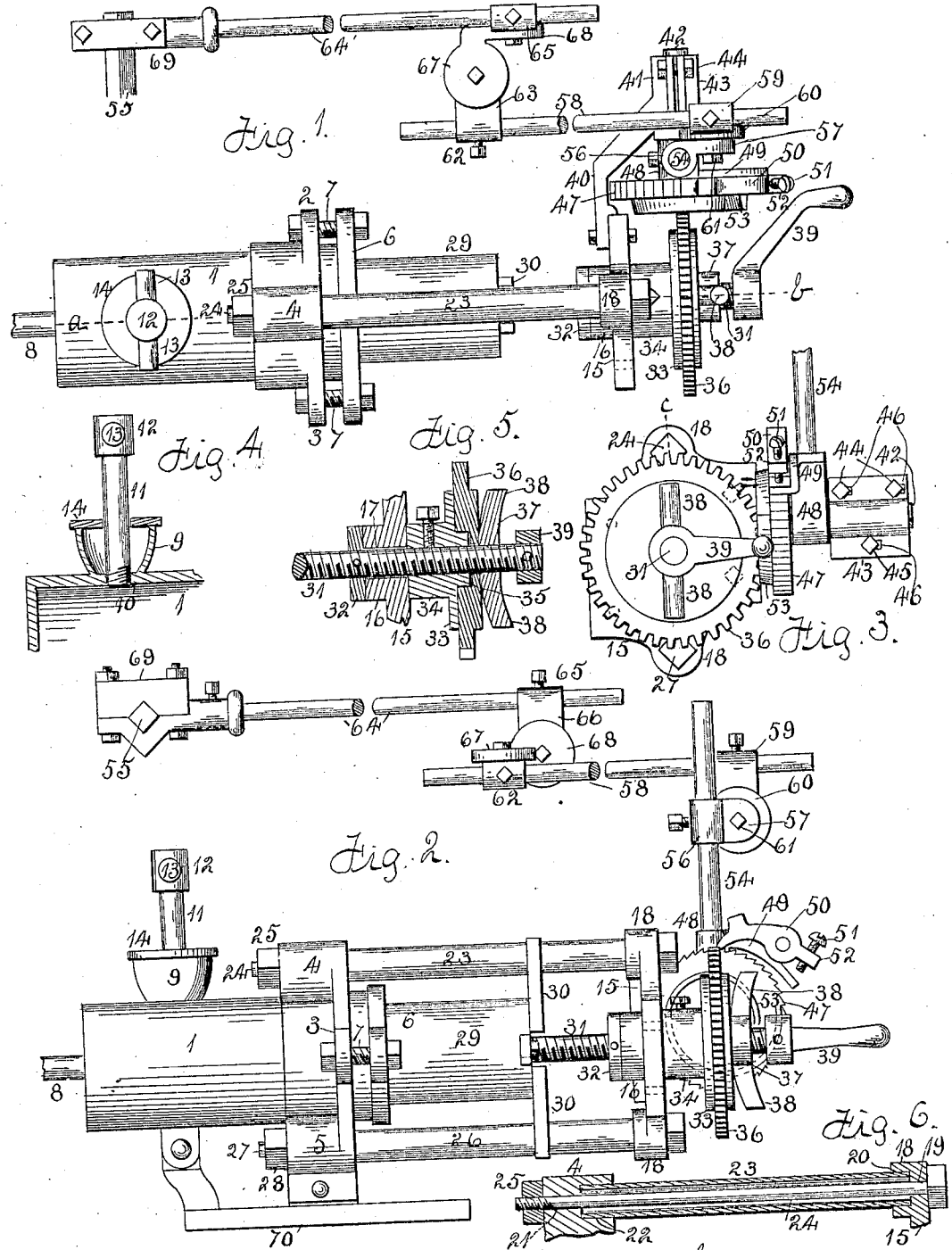

ALBERT BYINGTON, OF ROCHELLE, ILLINOIS.

LUBRICATOR.

No. 852,165.  Specification of Letters Patent.  Patented April 30, 1907.

Application filed May 28, 1906. Serial No. 319,209.

*To all whom it may concern:*

Be it known that I, ALBERT BYINGTON, a citizen of the United States, residing at Rochelle, in the county of Ogle and State of Illinois, have invented certain new and useful Improvements in Lubricators, of which the following is a specification.

The object of this invention is to construct a lubricator, more especially for steam engines, in which the oil is forced out by a slidable piston located within a cylinder and friction operated devices for moving the piston in one direction, so that when the piston is at the end of its stroke, the friction operated devices will slip, thereby preventing the breakage of the parts.

In the accompanying drawings. Figure 1 is a plan view. Fig. 2 is a side elevation. Fig. 3 is an end elevation. Fig. 4 is a vertical section on dotted line *a* Fig. 1. Fig. 5 is a vertical section on dotted line *b* Fig. 1. Fig. 6 is a vertical section on dotted line *c* Fig. 3.

The cylinder 1 is provided with two pair of ears 2, 3 and 4, 5. A stuffing box 6 is held in connection with the cylinder by the bolts 7 connecting it with the ears 2 and 3. This cylinder has a discharge pipe 8 connected with its closed end, and has a cup-shaped receptacle 9 formed with a screw-threaded opening 10 communicating with the interior of the cylinder near its closed end. A section of pipe 11 has one end provided with a cap 12 from which extend two projections 13. The other end of this pipe section has a screw-threaded connection with the screw-threaded opening 10. A plate 14 is located over the upper end of the cup-shaped receptacle 9 and through which the pipe section 11 passes. In filling the cylinder with oil this pipe section is removed, also the plate 14. The plate serves to keep dirt from entering the receptacle.

A cross-head 15 is provided with a central hub 16 having a smooth opening 17. The ends 18 of this cross-head are each provided with an opening 19, and each has an enlargement 20 around its opening. The ears 4 and 5 are each provided with an opening 21, and each has an enlargement 22 around its opening. Within the enlargements of the ear 4 and one of the ends 18 of the cross-head are located the ends of the pipe 23, and the pipe is held therein by a headed rod 24 passing through the pipe 23, ear 4 and end 18, and receiving a nut 25 on its screw-threaded end.

Within the enlargements of the ear 5 and one of the ends 18 of the cross-head are located the ends of a pipe 26, and the pipe is held therein by a headed rod 27 passing through the pipe 26, ear 5 and end 18, and receiving a nut 28 on its screw-threaded end. This cross-head 15 is thus rigidly connected to the cylinder.

A piston 29 has one end located within the cylinder and surrounded by the stuffing box 6. From the other end of the piston extend two guide arms 30, which embrace the pipes 23 and 26, thereby preventing the piston from rotating, but permitting it to have a lengthwise movement. A screw 31 has a screw-threaded connection with the closed end of the piston and extends through the smooth opening 17 in the hub 16 of the cross-head 15.

A collar 32 is pinned to the screw 31 and bears against one face of the hub 16. A plate 33 has a boss 34 which is connected to the screw 31 by a set screw and located against the outer face of the cross-head 15. This plate is provided with a reduced portion 35, serving as a support for a toothed wheel 36 in a manner to permit the toothed wheel to revolve independent of its support. A clamping nut 37 has a screw-thread connection with the screw 31 and is located adjacent to the outer face of the toothed-wheel 36. This clamping nut has projections 38 by which it may be turned. A crank 39 is pinned to the outer end of the screw 31.

To the cross-head 15 is secured a bracket 40 having its free end 41 in box form, a shaft 42 is held in place in the box by the cap portion 43 which is connected to the box by the screws 44 and 45. The cap portion does not closely fit the box which permits the shaft 42 to be held in a manner to permit it to rotate with more or less friction applied, which is accomplished by tightening the screw 45. The opening 46 in the cap portion through which the screws 44 and 45 pass are elongated in the lengthwise direction of the cap, in order that the cap may be adjusted lengthwise for the purpose to hereinafter appear.

To one end of the shaft 42 is rigidly connected a ratchet wheel 47. Between the cap 43 and the ratchet wheel 47 on the shaft 42 is pivotally located a collar 48 having a profection 49 extending from it. To this projection 49 is pivoted a dog 50 which is so located that it will engage the teeth of the ratchet wheel 47. A screw 51 is supported by the tail 52 of the dog, and limits the movement of the dog in one direction. The face of the ratchet wheel 47 is provided with a spiral projection 53 with which the toothed wheel 36 engages. The collar 48 has an opening within which is located a rod 54. As the toothed wheel 36 is located across the face of the spiral projection 53, the toothed wheel is held from rotative movement other than that imparted to it by the spiral projection. When the clamping screw 37 is turned free of the toothed wheel 36, the screw 31 can be rotated by the crank 39 in a manner to withdraw the piston 29 its full movement. The cylinder is then filled with oil and the opening 10 closed. The clamping screw 37 is then turned against the toothed wheel 36 which will clamp it against the plate 33 thereby forming a friction connection between the toothed wheel and screw 31, and the greater the friction applied, the greater will be the influence of the toothed wheel upon the screw. The collar 48 is oscillated upon the shaft 42 by a connection between the rod 54 and a moving part of the engine to be lubricated. This movement of the collar will cause the dog 50 to engage the teeth of the ratchet wheel 47 thereby imparting to the ratchet wheel an intermittent rotary movement. This movement of the ratchet wheel will impart a similar movement to the spiral projection 53, as it is a part of the wheel. Each complete revolution of the spiral projection 53 will rotate the toothed wheel 36 one tooth, and the toothed wheel 36 will impart a slight rotary movement to the screw. This movement of the screw, it being held against lengthwise movement, will force the piston in the cylinder a slight distance, which will force oil out the discharge opening 8 to the part of the engine to be lubricated. If the collar 48 be given a greater oscillating movement, the greater will be the distance the piston will be forced in the cylinder at each such oscillation.

As the connection between the rod 54 and the part of the engine imparting movement to it, may be at different angles under different conditions or construction of engines, I have provided a kind of universal joint or link connection between these parts. The part 55 represents a movable projection or rod operated by the engine.

To the rod 54 is adjustably connected a collar 56 having a projection 57. An intermediate rod 58 has a collar 59 adjustably connected to it, this collar has a projection 60. The projections 57 and 60 of the collars 56 and 59 are adjustably connected by the screw 61.

To the rod 58 is adjustably connected a collar 62 which has a projection 63. The rod 64 has a collar 65 adjustably connected to it, and is provided with a projection 66. The projection 63 of the collar 62 is connected to the projection 66 of the collar 65 by the plates 67 and 68 located at right angles to one another. A two part clamp 69 is connected to the rod 64. This two part clamp embraces the part 55 forming a portion of the engine.

By means of the various collars having the various adjustments on the rods, a connection between the rod 54 and the part 55 can be made.

By making the cap 43 lengthwise movable any wear of the collar 48 can be taken up.

To the lower edge of the cylinder is secured a foot piece 70 by which the lubricator is secured in place.

The bracket 40 supporting the spiral projection and its operative parts can be bodily adjusted in connection with the opposite edge of the cross-head, which will place the spiral projection and its operative parts on the opposite side of the cylinder in order that a connection with the engine can be made.

I claim as my invention.

1. In a lubricator, the combination of a cylinder, a piston located in the cylinder capable of a lengthwise movement but held against rotation, a screw having a screw-thread connection with the piston, held against lengthwise movement but capable of rotation, a toothed wheel loosely supported by the screw, friction devices for forming a connection between the wheel and screw and means for imparting an intermittent rotary movement to the wheel.

2. In a lubricator, the combination of a cylinder, a piston located in the cylinder capable of a lengthwise movement but held against rotation, a screw having a screw-thread connection with the piston, held against lengthwise movement but capable of rotation, a toothed wheel loosely supported by the screw, friction devices for forming a connection between the wheel and screw, a rotative spiral projection in engagement with the toothed wheel, and means for imparting an intermittent rotary movement to the spiral projection.

3. In a lubricator, the combination of a cylinder, a piston located in the cylinder capable of a lengthwise movement but held against rotation, a screw having a screw-thread connection with the piston, held against lengthwise movement but capable of rotation, a collar rigidly connected to the screw, a toothed wheel loosely supported by the screw, a screw-nut having a screw-thread engagement with the screw and capable of clamping the wheel against the collar, and means for imparting an intermittent rotary movement to the wheel.

4. In a lubricator, the combination of a cylinder, a cross-head, two pipes forming a connection between the cylinder and cross-head, a bolt passing through each pipe and projections on the cylinder and cross-head serving to clamp the parts together, a piston located in the cylinder capable of a lengthwise movement but held against rotation through an engagement with the pipes, a screw having a screw-thread connection with the piston capable of a rotary movement but held against lengthwise movement, and means for imparting an intermittent rotary movement to the screw.

5. In a lubricator, the combination of a cylinder, a piston located in the cylinder capable of a lengthwise movement but held against rotation, means for imparting an intermittent inward sliding movement to the piston, a cup-shaped receptacle having a screw-threaded opening, a movable cap for the receptacle, and a screw plug for the opening extending through the cap.

6. In a lubricator, the combination of a cylinder, a piston located in the cylinder capable of a lengthwise movement but held against rotation, a screw having a screw-thread connection with the piston capable of a rotary movement but held against lengthwise movement, a toothed wheel having a connection with the screw for imparting a rotary movement thereto, a ratchet wheel having a connection with the toothed wheel, a shaft supporting the ratchet wheel, a box, a lengthwise movable cap for the box, the shaft supported by the box, a collar on the shaft located between the cap and ratchet wheel, and a dog pivotally supported by the collar and capable of engaging the teeth of the ratchet wheel.

ALBERT BYINGTON.

Witnesses:
　A. W. GUEST,
　O. A. WEDLER.